(12) United States Patent
Harvey

(10) Patent No.: US 10,921,760 B2
(45) Date of Patent: Feb. 16, 2021

(54) PREDICTIVE CONTROL LOOPS USING TIME-BASED SIMULATION AND BUILDING-AUTOMATION SYSTEMS THEREOF

(71) Applicant: PassiveLogic, Inc., Holladay, UT (US)

(72) Inventor: Troy Aaron Harvey, Brighton, UT (US)

(73) Assignee: PASSIVELOGIC, INC., Holladay, UT (US)

( * ) Notice: Subject to any disclaimer, the term of this patent is extended or adjusted under 35 U.S.C. 154(b) by 80 days.

(21) Appl. No.: 16/006,713

(22) Filed: Jun. 12, 2018

(65) Prior Publication Data

US 2019/0377306 A1     Dec. 12, 2019

(51) Int. Cl.
  *G05B 13/04*     (2006.01)
  *G05B 13/02*     (2006.01)

(52) U.S. Cl.
  CPC ....... *G05B 13/048* (2013.01); *G05B 13/0265* (2013.01)

(58) Field of Classification Search
  None
  See application file for complete search history.

(56) References Cited

U.S. PATENT DOCUMENTS

| | | |
|---|---|---|
| 5,224,648 A | 7/1993 | Simon et al. |
| 6,119,125 A | 9/2000 | Gloudeman et al. |
| 6,445,066 B1 | 9/2002 | Miller |
| 6,967,565 B2 | 11/2005 | Lingemann |
| 9,020,647 B2 | 4/2015 | Johnson et al. |
| 9,258,201 B2 | 2/2016 | McCoy et al. |
| 9,298,197 B2 | 3/2016 | Matsuoka et al. |
| 9,557,750 B2 | 1/2017 | Gust et al. |
| 9,664,400 B2 | 5/2017 | Wroblewski et al. |
| 10,845,771 B2 | 11/2020 | Harvey |

(Continued)

OTHER PUBLICATIONS

ANSI/ASHRAE Standard 55/2013: Thermal Environmental Conditions for Human Occupancy, ASHRAE, 2013.

(Continued)

*Primary Examiner* — Mohammad Ali
*Assistant Examiner* — Saad M Kabir
(74) *Attorney, Agent, or Firm* — Kunzler Bean & Adamson, PC

(57) ABSTRACT

Apparatuses, systems, methods, and computer program products are presented for a building-automation system controller. A building-automation system controller manages and/or controls energy, thermal, and/or functional systems and subsystems thereof utilizing a sensor, a physical model, a simulation engine, one or more predictive control loops, an optimal cost function, and an error band. A control loop is designed to utilize a simulation engine to predict a simulated predicted sensor value of a controlled system under a simulated control regime. A simulated control regime having an optimal cost function is selected for a controlled system until the controlled system diverges from the simulated predicted sensor value beyond an error band indicating uncertainty in a predicted future behavior so that a control loop is formed utilizing a simulation engine to predict a different future behavior in response to the controlled system diverging from the simulated predicted sensor value.

21 Claims, 9 Drawing Sheets

(56) References Cited

U.S. PATENT DOCUMENTS

| | | | |
|---|---|---|---|
| 2002/0152298 A1 | 10/2002 | Kikta et al. | |
| 2008/0082183 A1 | 4/2008 | Judge | |
| 2015/0112497 A1* | 4/2015 | Steven | G06Q 50/06 700/291 |
| 2016/0201934 A1* | 7/2016 | Hester | F24F 11/30 700/276 |
| 2017/0103483 A1* | 4/2017 | Drees | H02J 3/14 |
| 2020/0348632 A1 | 11/2020 | Harvey | |

OTHER PUBLICATIONS

De Dear, et at., "Developing an Adaptive Model of Thermal Comfort and Preference," ASHRAE Transactions 1998, vol. 104, Part 1.

Gagge et al., "An Effective Temperature Scale Based on a Simple Model of Human Physiological Regulatory Response," ASIYRAE Semiannnual Meeting in Philadelphia, Pennsylyania, Jan. 24-28, 1971.

Gagge, et. al., A Standard Predictive index of Human Response to the Thermal Environment, ASHRAE Transactions 1986, Part 2B.

Medhi, et al.,Jan. 2011, "Model-Based Hierarchical Optimal Control Design for HVAC Systems," ASME 2011 Dynamic Systems and Control Conference and Bath/ASME Symposium on Fluid Power and Motion Control.

Nakahara, "Study and Practice on HVAC System Commissioning," The 4th international Symposium on HVAC, Beijing, China, Oct. 9-11, 2003.

Nassif, et al., "Self-tuning dynamic models of HVAC system components", Energy and Buildings 40 (2008) 1709-1720.

Nassif, Nabil, (2005), Optimization of HVAC control system strategy using two-objective genetic algorithm [microform].

Qin et al., "Commissioning and Diagnosis of VAV Air-Conditioning Systems," Proceedings of the Sixth International Conference for Enhanced Building Operations, Shenzhen, China, Nov. 6-9, 2006.

Salsbury et al., "Automated Testing of HVAC Systems for Commissioning," Laurence Livermore National Laboratory, 1999, LBNL-43639.

Vaezi-Nejad, H.; Salsbury, T.; Choiniere, D. (2004). Using Building Control System for Commissioning. Energy Systems Laboratory (http://esl.tamu.edu); Texas A&M University (http://www.tamu.edu). Available electronically from http : / / hdl .handle .net/1969 .1 /5060.

Welsh, "Ongoing Commissioning (OCx) with BAS and Data Loggers," National Conference on Building Commissioning: Jun. 3-5, 2009.

Xiao et al., "Automatic Continuous Commissioning of Measurement Instruments in Air Handling Units," Building Commissioning for Energy Efficiency and Comfort, 2006, vol. VI-1-3, Shenzhen, China.

U.S. Appl. No. 15/995,019 Office Action dated Oct. 8, 2020.

* cited by examiner

PREDICTIVE CONTROL LOOPS USING TIME-BASED SIMULATION AND BUILDING-AUTOMATION SYSTEMS THEREOF

FIELD

The present disclosure relates to control of building systems using automated means. More specifically the present disclosure relates to building of an automation system algorithm using a method of predictive time-based simulation of control systems via a procedure of optimizing resource use for human comfort. The present disclosure particularly addresses the control and automation of HVAC, energy, lighting, and irrigation systems.

BACKGROUND

Building automation systems are used in buildings to manage energy systems, HVAC systems, irrigation, accessory building systems, and controllable building structures.

There has been little effort toward incorporating these systems into a single controller with a unified operational model, thus allowing a more intelligent method of managing the energy interrelationships between various building components and their respective control algorithms. This is because the field has been dominated by model-free control loops, which have difficulty in managing sophisticated, tightly-coupled systems or adaptively tuning complex models in a predictable manner.

SUMMARY

The present disclosure provides a solution to the problem of economically automating the control strategies for building automation and applying a closed loop, heuristic, model based predictive control algorithm.

In one embodiment, there is a building system controller comprising: a controlled system; a physical model that comprises a simulation engine designed to simulate a behavior of the controlled system by means of evaluating the physical model; a sensor designed to provide data to calculate a simulated predicted sensor value; and a control loop designed to utilize the simulation engine to predict a future behavior of the controlled system under a simulated control regime; wherein the results of the simulation control regime are compared in terms of a cost function, such that the simulation control regime having minimized cost function is selected for controlling the building system; and wherein the building system is controlled by the simulation control regime having minimized cost function until it diverges from the simulated predicted sensor value to produce a control loop.

There has thus been outlined, rather broadly, certain non-limiting features of the disclosure in order that the detailed description thereof that follows may be better understood and in order that the present contribution to the art may be better appreciated.

Numerous objects, features and advantages of the present disclosure will be readily apparent to those of ordinary skill in the art upon a reading of the following detailed description of presently preferred, but nonetheless illustrative, embodiments of the present disclosure when taken in conjunction with the accompanying drawings. The disclosure is capable of other embodiments and of being practiced and carried out in various ways. Also, it is to be understood that the phraseology and terminology employed herein are for the purpose of descriptions and should not be regarded as limiting.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptions or variations of the present disclosure.

This section summarizes some aspects of the present disclosure and briefly introduces some preferred embodiments. Simplifications or omissions in this section as well as in the abstract or the title of this description may be made to avoid obscuring the purpose of this section, the abstract and the title. Such simplifications or omissions are not intended to limit the scope of the present disclosure nor imply any limitations.

BRIEF DESCRIPTION OF THE DRAWINGS

To further clarify various aspects of some example embodiments of the present disclosure, a more particular description of the disclosure will be rendered by reference to specific embodiments thereof that are illustrated in the appended drawings. It is appreciated that the drawings depict only illustrated embodiments of the disclosure and are therefore not to be considered limiting of its scope. The disclosure will be described and explained with additional specificity and detail through the use of the accompanying drawings in which.

DETAILED DESCRIPTION

Figure 1:
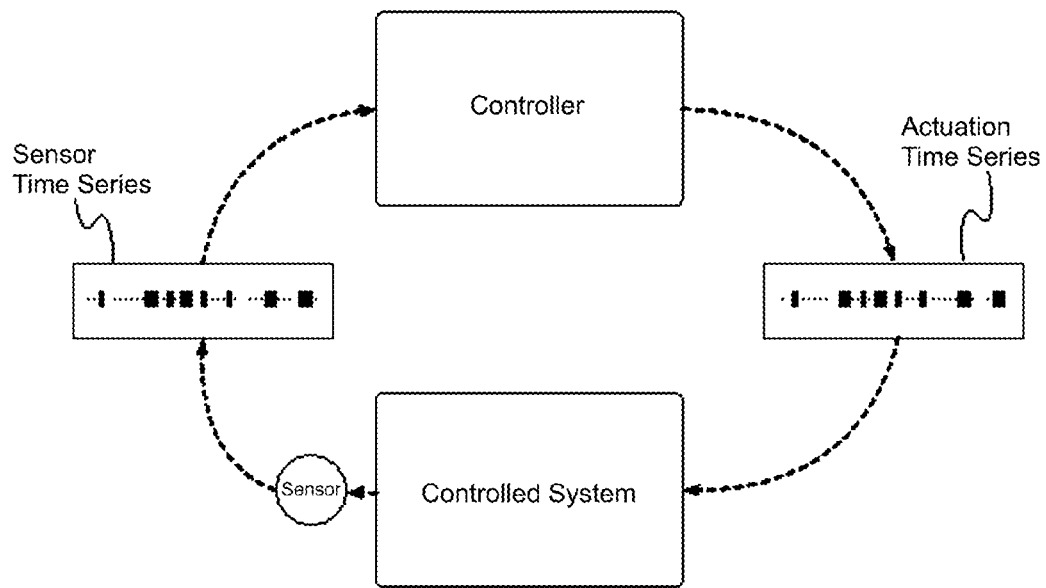
FIG. 1—One architectural embodiment of a building control loop

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the disclosure and together with the description, serve to explain the principles of the disclosure. To the accomplishment of the foregoing and related ends, certain illustrative aspects of the disclosure are described herein in connection with the following description and the annexed drawings. These aspects are indicative, however of, but a few of the various ways in which the principles of the disclosure can be employed and the subject disclosure is intended to include all such aspects and their equivalents. Other advantages and novel features of the disclosure will become apparent from the following detailed description of the disclosure when considered in conjunction with the drawings.

Explanation will be made below with reference to the drawings for illustrative embodiments concerning the predictive building control loop according to the current disclosure.

There are several advantages that, in certain embodiments, can be gained from applying model-based control to building automation systems.

Model based control, in some embodiments, allows for altering control schemes based on external factors including but not limited to weather, occupancy, and user input. The physical system model may allow for simulation of these external factors' effects on building comfort and efficiency. Once the effects of the factors on the system are known, the controller, in some embodiments, can take the necessary control actions to compensate for the effects. For example, a building with higher occupancy will require less heating or more cooling to offset the heat generated by the occupants. Furthermore, model based control may allow for inclusion of predicted external factors. For example, future weather predictions can be taken into account when deciding on control actions. This may allow the controller to more effectively utilize resources by building up energy stores while it is cheap and depleting stores when resources are expensive. The same can be said for future occupancy predictions, in certain embodiments. A schedule could be monitored and comfort settings could be allowed to be relaxed in the most efficient way possible for times when no occupancy is expected. The inclusion of a physical model may enable the consideration of any and all external influencing factors, current, past or future, by the system controller.

Model based control may allow for less complicated commissioning. By allowing the user to define a direct physical model of the system, in some embodiments, some or all of the abstraction of the system into mathematical models can be done by the controller. Removing this level of abstraction from the user may allow for faster, easier, more accurate, and/or more flexible model creation.

Model based control may, in some embodiments, allow for real time system monitoring, and/or software repair. By including a model of some or all of the equipment in the system, and sensing equipment performance, it may become trivial to sense equipment faults. Because the controller has a model of the equipment's predicted operation, any deviation from normal operation, in certain embodiments, can be investigated automatically. The knowledge of an equipment fault may allow for diagnostic and remediation actions to be taken by the controller along with alerting the user of the fault. The possibilities of remediation of soft equipment faults may be specifically beneficial as they may save the need for human interaction with malfunctioning equipment.

Model based control, in some embodiments, allows for changing control actions due to time varying parameters. There may be many influencing parameters that can be taken into account in a model based control system that cannot be addressed by more traditional control systems. These parameters may include but are not limited to equipment aging, weather, occupancy, equipment fault, insulation values, resource costs, and user input. Each of these parameters may have significant effects on the most efficient control action available to the controller.

By extrapolating simulations into the future, in certain embodiments, control can be further optimized over time. Controlling for resource use minimization over time may require knowledge of future system needs. Knowledge of the future needs may allow for preparations for the needs to be made in the most optimal way. The most optimal control scheme over time will not necessarily be the same as an optimal control scheme computed without regard for future concerns. Stated differently, the sum of optimal control actions for each time slice, in some embodiments, will likely not be the most optimal control scheme. By extrapolating simulations to include future needs, the system can allocate resources to future needs when they will have the most efficient impact as opposed to waiting for the need to be urgent.

In its most fundamental form, the building control system comprises a control loop as in FIG. 1, showing a controller that controls a controlled system, which is observed by sensors, where the sensors feed back the operational information to the controller to change control direction based on divergence from the expected values. In the present disclosure, the predicted pattern of control predate the timing of the control actions, while the sensor feedback happens in real-time and is then compared to the predicted or expected values. This is what we call "future-forward" control, instead of the conventional reactive control. Key to future-forward control is that error of the control loop is determined from the comparison of the sequence of prediction, that is generated at a time predating the control action, versus the actual behavior of the system, typically as measured by sensors.

The controlled system as represented in FIG. 1, wherein, the controlled system can be any one or more of the following systems such as building automation systems, heating systems, cooling systems, ventilation systems, power management systems, renewable energy systems, irrigation systems, occupancy systems, lighting systems, environmental control systems, humidity control systems, air quality management systems, window operator systems, shade systems, or the like.

In one embodiment, the predicted pattern of control is generated from a physical model of the system under control. Wherein the physical model mathematically models the behavior of the system. This model is computed in a simulation engine that simulates the system faster than real-time. This simulation is then used to generate a pattern control a-priori based on the predicted future behavior of the system.

In some embodiments, the predicted pattern of optimal control may comprise a time-series collection of future control actions of the controlled system and a collected time series of sensor results.

Figure 2:
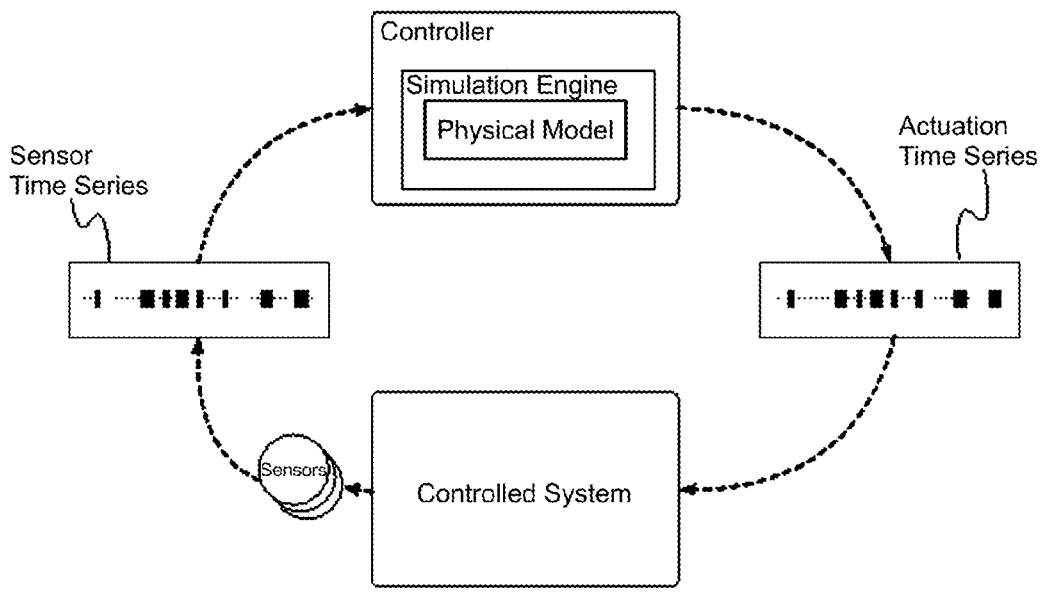
FIG. 2—One architectural embodiment of a building control loop containing a simulation engine wherein the simulation engine contains a physical model FIG. 3—One architectural embodiment of a building control loop containing a simulation engine wherein the simulation engine stores the simulate sensor(s) value time series FIG. 4—One architectural embodiment of a building control loop containing a simulation engine and cost function wherein the simulation engine contains a physical model FIG. 5—One architectural embodiment of a building control loop containing a simulation engine that accepts user input FIG. 6—One architectural embodiment of a building control loop containing a simulation engine and cost function that accepts user input and outside predictions FIG. 7—An example of predicted pattern of sensor futures and their respective histories FIG. 8—An example of predicted pattern of sensor futures and the concomitant control regime generated from simulation of physical model(s)

FIG. 2 shows one embodiment of a controller containing a simulation engine. The simulation engine in FIG. 2 may allow the system to predict the outcome of any available control action using its physical model of the system. The predictions may have many benefits, some of which may be detailed below. The physical model may be defined as any model of the controlled system and may be time variant.

Figure 3:
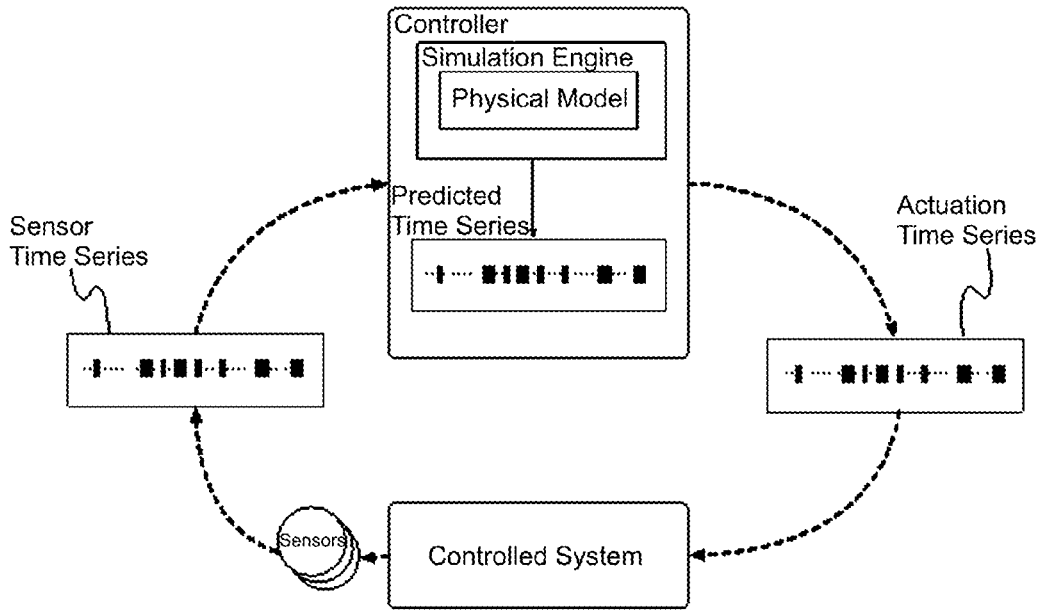

FIG. 3 shows one embodiment of a controller containing a simulation engine that stores off the predicted sensor values for later comparison with the actual sensor values, to be evaluated by an error band or cost function.

Figure 4:
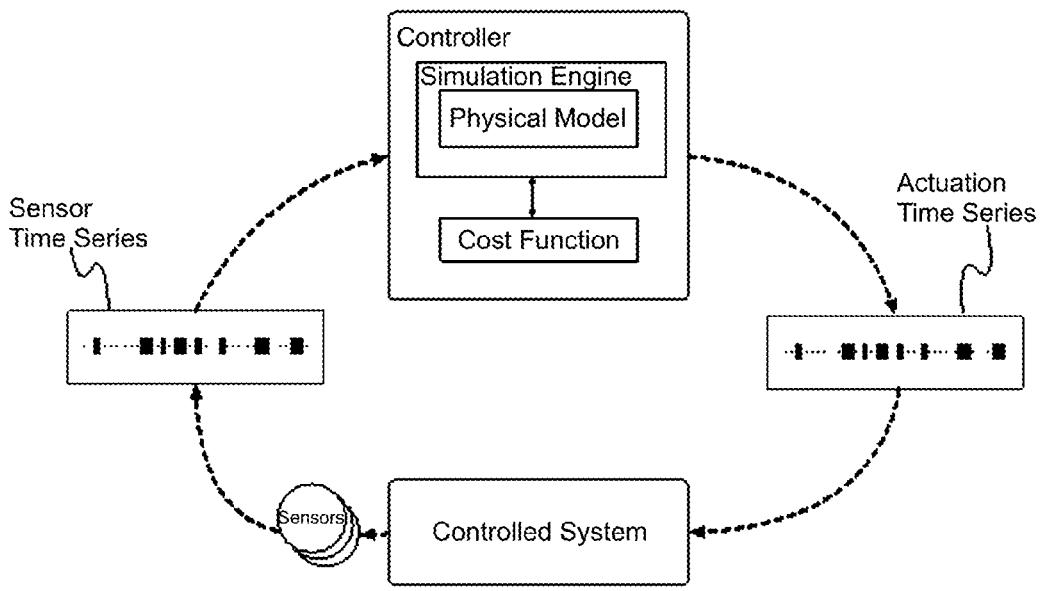

FIG. 4 shows one embodiment of how a cost function can be applied to the simulation engine. Any and all resources can be given values in the cost function. The resources may include but are not limited to one or more of natural gas, gasoline, propane, home heating oil, coal, water, electricity, emissions, equipment longevity, heat, time outside of a defined comfort zone, or the like. Any possible control actions can first be assessed according to the assigned cost function in order to find the most optimal control action according to the cost function. The cost function may be time variant. The cost function may be linked with outside factors including, but not limited to monetary value of the resources, user preferences, and/or changes in the physical model.

The cost function applied to the simulation engine may comprise models of any one or more of the following: energy use, primary energy use, energy monetary cost, human comfort, the safety of building or building contents, the durability of building or building contents, microorganism growth potential, system equipment durability, system equipment longevity, environmental impact, and/or energy use CO2 potential.

As mentioned above, the cost function may utilize a discount function based on discounted future value of a cost. In some embodiments, the discount function may devalue future energy as compared to current energy such that future uncertainty is accounted for, to ensure optimized operation over time. The discount function may devalue the future cost function of the control regimes, based on the accuracy or probability of the predicted weather data and/or on the value of the energy source on a utility pricing schedule, or the like.

There may be infinitely many possible control regimes, some of which perform well according to some metric, while others might perform poorly.

One form of time variance that may be included in the physical model comprises heuristics. By employing heuristics, in certain embodiments, any control action can be evaluated, based on feedback from sensor data or some other form of feedback, to ensure that the control action had the intended effect. If the control action did not have the intended effect the physical model can be changed to exert more effective control actions in the future.

Figure 7:
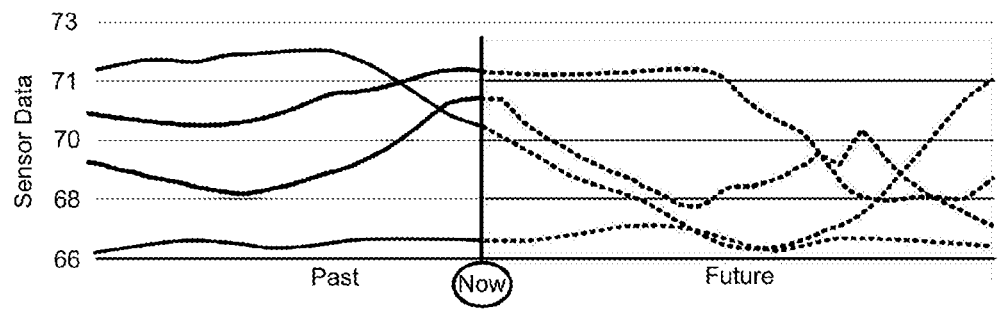

FIG. 7 illustrates one embodiment of how data may be gathered from various sensors, providing a record of past sensor values, and how the same sensor values may be predicted into the future using the system model. The controller may then use the predicted sensor values as a basis for deciding on control actions.

Figure 8:
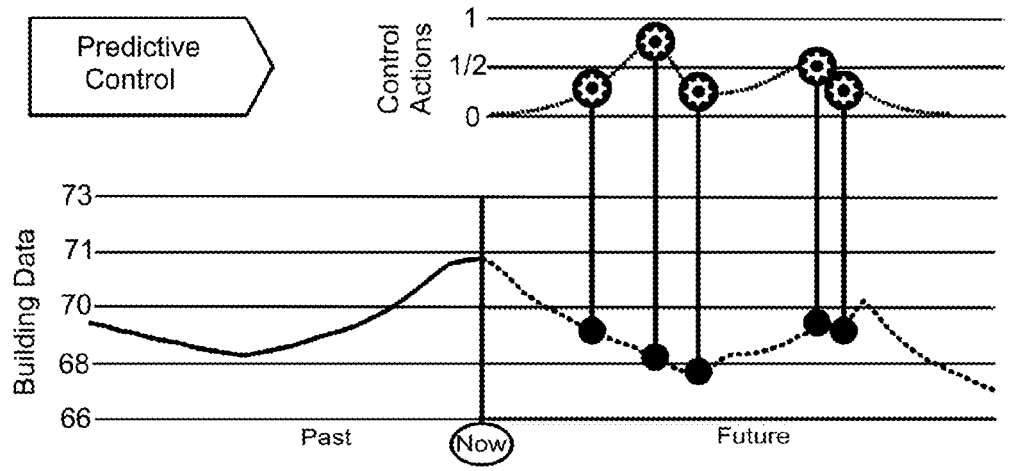

FIG. 8 shows one embodiment of how future control actions can be determined utilizing a predicted sensor value. Other embodiments may use any number of sensors to decide on control actions. These control actions may correspond to commands to over specific pieces of equipment (e.g. turn on fan to high).

Figure 9:
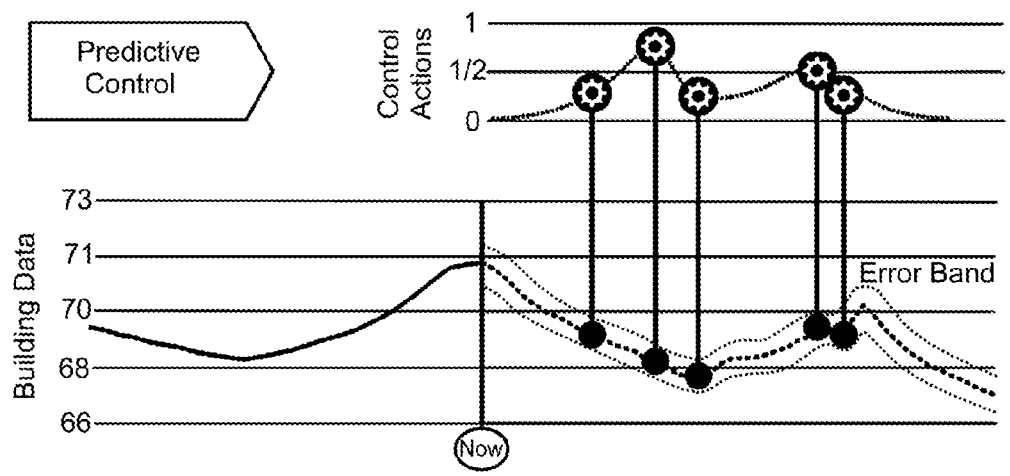
FIG. 9—An example of predicted pattern of sensor futures and the concomitant control regime generated from simulation of physical model(s), and corresponding error band.
Figure 10:
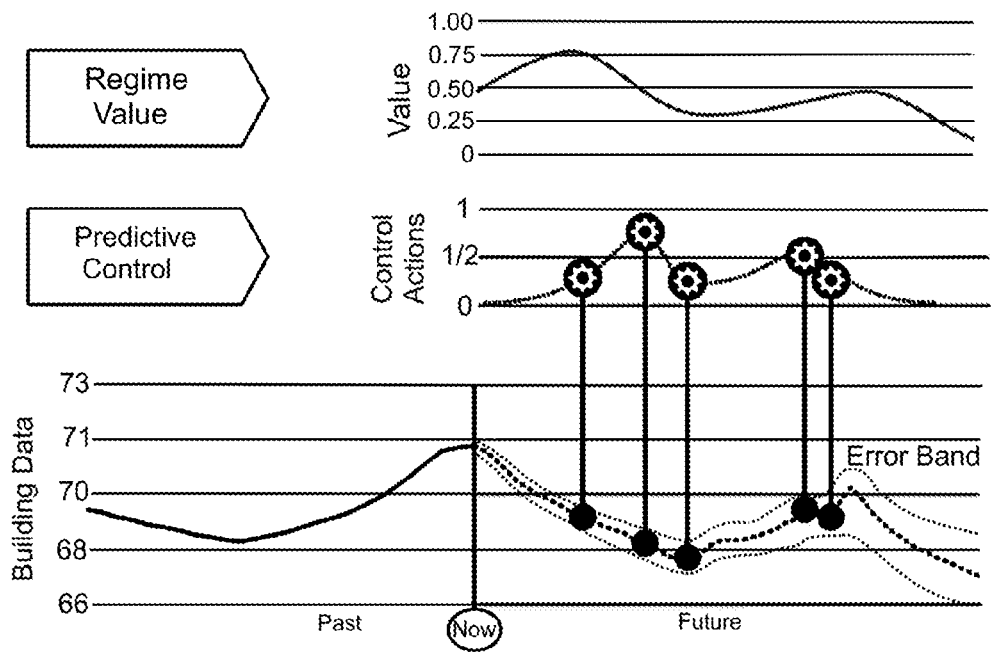
FIG. 10—An example of predicted pattern of sensor futures and the concomitant control regime generated from simulation of physical model(s), and corresponding error band, and the given control regime value.

The predicted sensor values previously referenced may not match reality, that is, actual future sensor values may not match previous predictions. This error may stem from an inaccurate model. The further in the future predictions are made the less certain the predictions may be. This is illustrated in FIG. 9, which shows an error band indicating the uncertainty in predicted values, which, in the depicted embodiment, grows as predictions are made farther into the future. That is, since the sensor values comprises a time series of predicted sensor values, the divergence from the predicted pattern of control may be determined by comparing the time series of predicted sensor values to actual stream of sensor(s) values, so that a path divergence is detected, where the divergence from the predicted pattern of control may be determined by an error band of the predicted sensor value.

Further, the error band may evolve from a mathematical function of predicted values of at least one sensor, where the mathematical function comprises one or more of a percentage range of expected values calculated from a time-series function of expected sensor values with their bounds ascertained from minimized cost function values subject to a human comfort limit, an equipment limit of allowed operation of expected sensor values, or the like.

Figure 11:
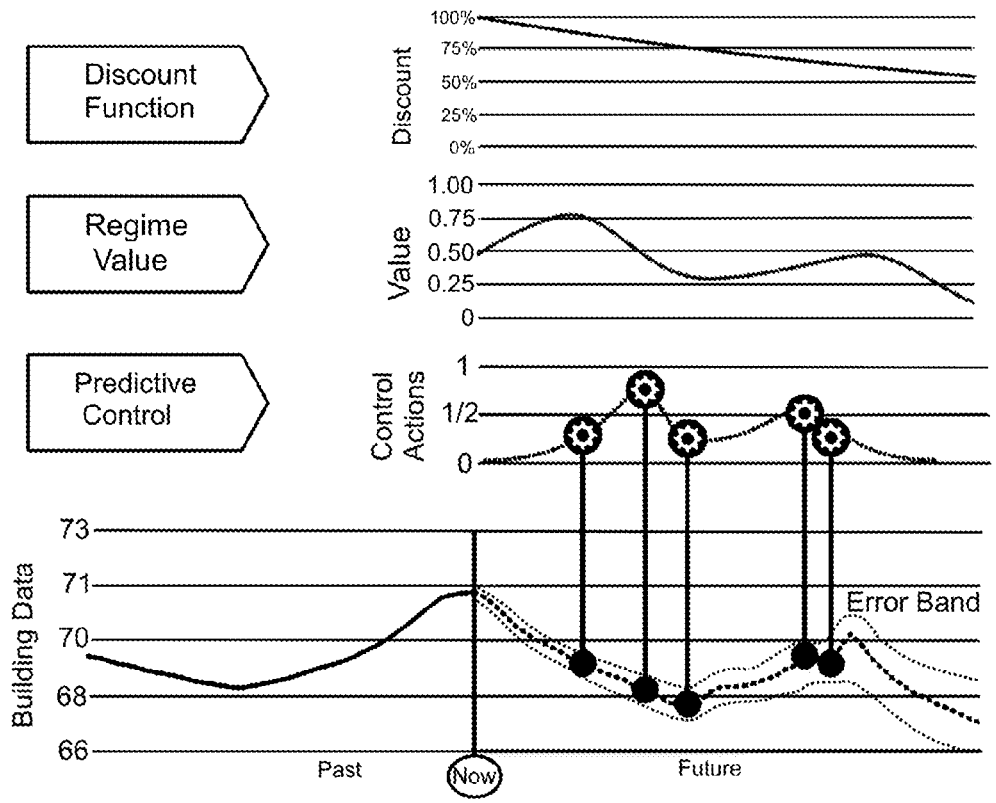
FIG. 11—An example of predicted pattern of sensor futures and the concomitant control regime generated from simulation of physical model(s), and corresponding error band, and the given control regime value, and corresponding discount rate applied due to future uncertainty.
Figure 12:
FIG. 12—One embodiment of an error band of sensor values.

The decided control actions may constitute a control regime. Such a regime may have a value function (or cost function), corresponding to the utility of the regime. The value function may indicate how desirable a particular control regime is based on some set of priorities (e.g. reducing energy consumption). Due to the error band described above, the regime value function may not entirely match reality. To deal with this, in certain embodiments, a discount function is introduced, as shown in FIG. 11. The discount function may be used to account for sensor uncertainty in the valuation of a particular control regime, and/or to devalue future decisions. The discount function may be applied to a particular value function, producing an error band on the regime value, as shown in FIG. 12.

Figure 13:
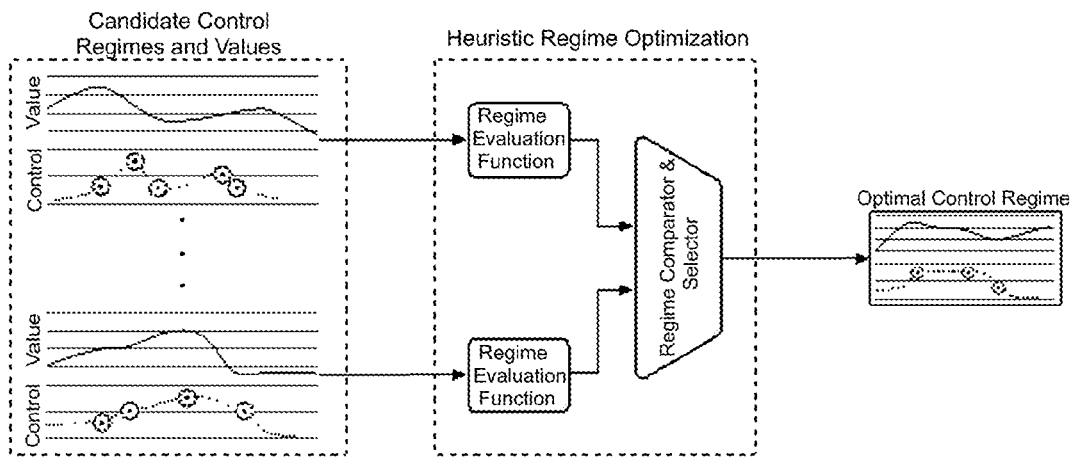
FIG. 13—One embodiment of a heuristic selection of the optimal regime.

FIG. 13 shows one embodiment of how various candidate control regimes, each having an associated value function and discount, function, may be evaluated for optimality. The heuristic regime optimizer may evaluate each candidate control regime based on some metric and may select the regime with the highest valuation. In this way, in certain embodiments, an optimal control regime may be determined.

Further, the optimal pattern of control may be performed by the controller of the building system, until sensor values diverge from the predicted sensor values or the error band thereof, at which point, the physical model may be evaluated again so as to seek a new regime having a new minimized cost function given changed system conditions. These sensor values may comprise a sensor fusion of a multiplicity of individual sensor values, and the method of choosing the most preferred may involve usage of any of the following techniques, such as Bayesian networks, Dempster-Shafer theory, central limit theorems, a Kalman filter, a particle filter, or the like.

An optimal regime may be selected by comparing a series of potential regimes, the comparison being performed by means of one or more of differential comparison, multivariate population selection, statistical classification, clustering, feature extraction, preference ranking, benchmarking, or the like, and the optimal regime may be selected by means of one or more of heuristic, metaheuristic, hyperhueristic, and/or machine learning algorithm. The means of selection may comprise one or more of: particle swarm organization, self-organizing migration algorithm, neural networks, group method of data handling, differential evolution, genetic algorithm, memetic algorithm, random forest, hill climbing algorithm, simulated annealing, monte-carlo methods, random search, fuzzy-logic, arithmetic mean, geometric mean, harmonic mean, trimean, median, mode, mid-range, quadratic mean (RMS), cubic mean, generalized mean, weighted mean, linear regression, logistic regression, polynomial regression, k-means clustering, k-nearest neighbors, decision trees, perceptron, kernel methods, support vector machines, ensemble methods, boosting, bagging, naïve Bayes, expectation maximization, Gaussian mixture models, Gaussian processes, principal component analysis, singular value decomposition, reinforcement learning, Voronoi decomposition, and/or social theory voting techniques and concepts, such as social welfare functions, social choice functions, single transferrable vote, Bucklin's rule, social decision schemes, collective utility functions, and/or Condorcet method and extensions such as Copeland's rule, maximin, Dodgson's rule, Young's rule, and/or ranked pairs, or the like.

Typical sensors of the building system controller may comprise one or more of a temperature sensor, flow sensor, humidity sensor, CO2 sensor, radiant temperature sensor, insolation sensor, wind sensor, occupancy sensor, rotational sensor, door movement sensor, rain sensor, snow sensor, light level sensor, or the like. These sensors may be able to collect an external data feed which may be one or more of weather data, tracking outdoor temperature data, wind data, humidity data, insolation data, calendar data, calendar data of holidays, or the like. More particularly, the occupancy sensor may be inferred via indirect data feeds of occupancy activity, including one or more of: computer network activity, door sensor activity, mobile device addresses on a local network, acoustic activity, visual occupant, thermal activity, or the like.

The sensors of the present disclosure may also collect the data feed of future data, parsed from an internet or network source of data, which may be combined with the output of the simulation engine operating on the same data to provide durability of the data, so that gaps in the feed data or a lost connection do not compromise the availability of the data and may also provide modification of the data feed information so that it represents the local conditions, accurately.

The present disclosure may utilize live data gathered by sensors in the controlled system to improve the system model through heuristic tuning and/or predicting with strong degrees of confidence via regression methods.

The physical model of the simulation engine, may comprise a variety of physical models. The physical models may describe the behavior of the climate, building, occupants, systems, sub-systems, and equipment. Some of these models may describe the behavior of the inputs or sensor values, such as climate, building, and occupant; and some of these models may describe the behavior of the controlled items, such as systems, sub-systems, and equipment.

The controlled models may be of arbitrary complexity. Models may describe inter-connected models of systems, each having sub-systems, with each sub-system having equipment. Equipment may be controllable or not.

Figure 14:
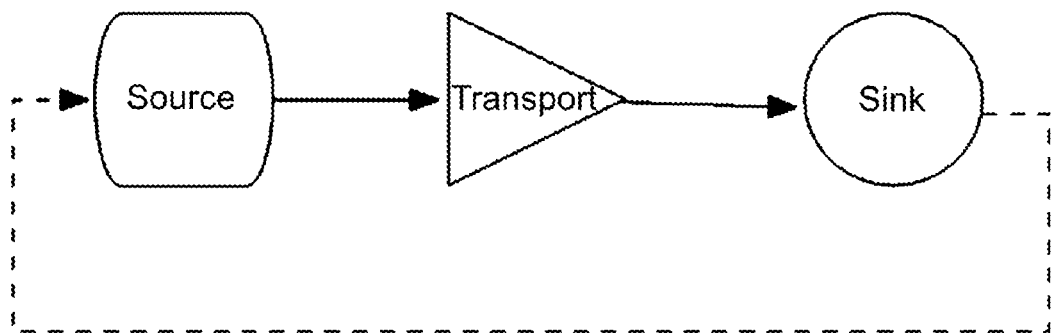
FIG. 14—One embodiment of a physical model system block diagram.

An embodiment of the simplest form of a controlled sub-system is illustrated in FIG. 14, Wherein the controlled sub-system comprises a source, a transport, and a sink.

The source of the building system controller may comprise one or more of, but is limited to: utility generated electricity, site generated electricity, boiler, steam generator, gas turbine, gas heater, chiller, heat pump, adsorption heat pump, ground source heat pump, furnace, air conditioner, photovoltaics, solar hot water collector, wind turbine, hydro turbine, liquid or solid thermal storage tanks, mass thermal storage well, thermal electric generators (e.g., peltier junctions, carrot cycle engines, or the like), and/or water sources of irrigation.

The sink of the building system controller may comprise one or more of the following, but is not limited to: buildings, building zones, building surfaces, building surface interlayers, electric batteries, electric loads, outdoor surfaces including snow melt surfaces, irrigation consuming masses, HVAC system equipment, functional control equipment, lights, motors, liquid or solid thermal storage tanks, mass thermal storage, phase change materials, and/or the like.

The transport of the building system controller may comprise one or more of the following, but is not limited to: pumps, fans, air handlers, dampers, valves, inverters, relays, actuators, linear divers, electromagnets, solenoids, switches, wires, pipes, and/or the like. Additionally, the building system controller may comprise a drivable resource, thermal, energy or water source or sink, or the like.

The simulation engine of the system, in one embodiment, is a composite comprising one or more sub-systems each comprising one or more of the equipment, systems, and/or models. Further, the simulation engine of the building controller system may comprise a composite of building models, human comfort models, climate models, and/or system models and may simulate the future behavior of the system utilizing models of one or more of: HVAC components, HVAC systems, energy systems, renewable energy systems, building envelopes, climate models, human comfort models, and/or resource consumption models, where the climate model may drive the resource consumption of the building model.

Figure 15:
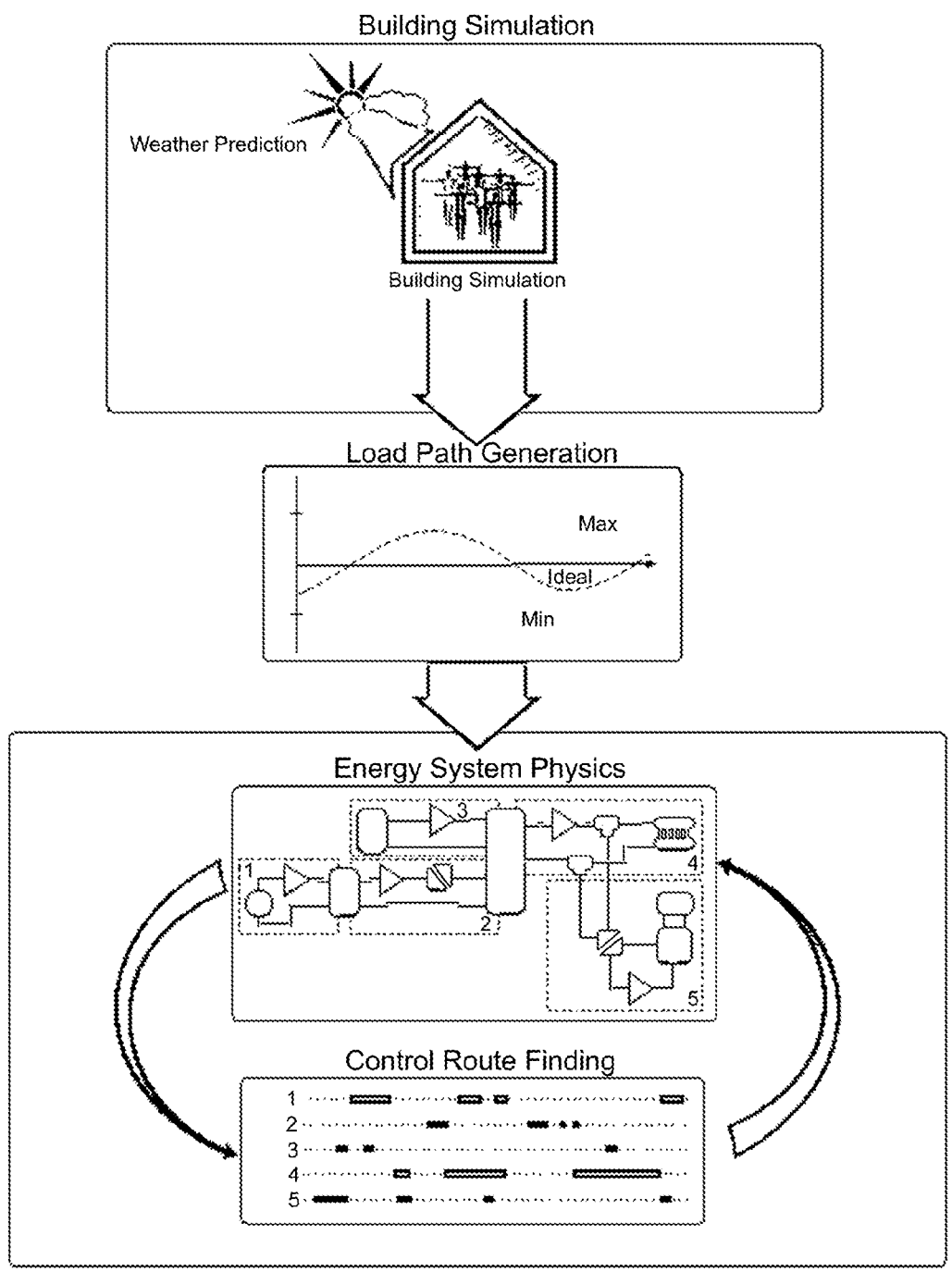
FIG. 15—One embodiment of a complete building automation system device

An embodiment of a complete building control system can be seen in FIG. 15, where the control simulation system computes the future behavior of the building envelope using a weather model to generate a load path. This load path is used to generate a control regime such that the simulation of the systems, sub-system, and equipment models with the concomitant control regime generate a good control outcome, often measured by a computation of optimality. The output of the simulation is a time series of predicted sensor values. This time series of control actions is then used to actuate the equipment in the controlled system, and the resulting sensor values of the system sensors are recorded in a time series. The two time series, predicted and actual, are then compared by means of an error function or error band. If the actual sensor time series diverges beyond the error band, the system simulates new futures, and the cycle starts again, thereby forming a controlled system.

Figure 16:
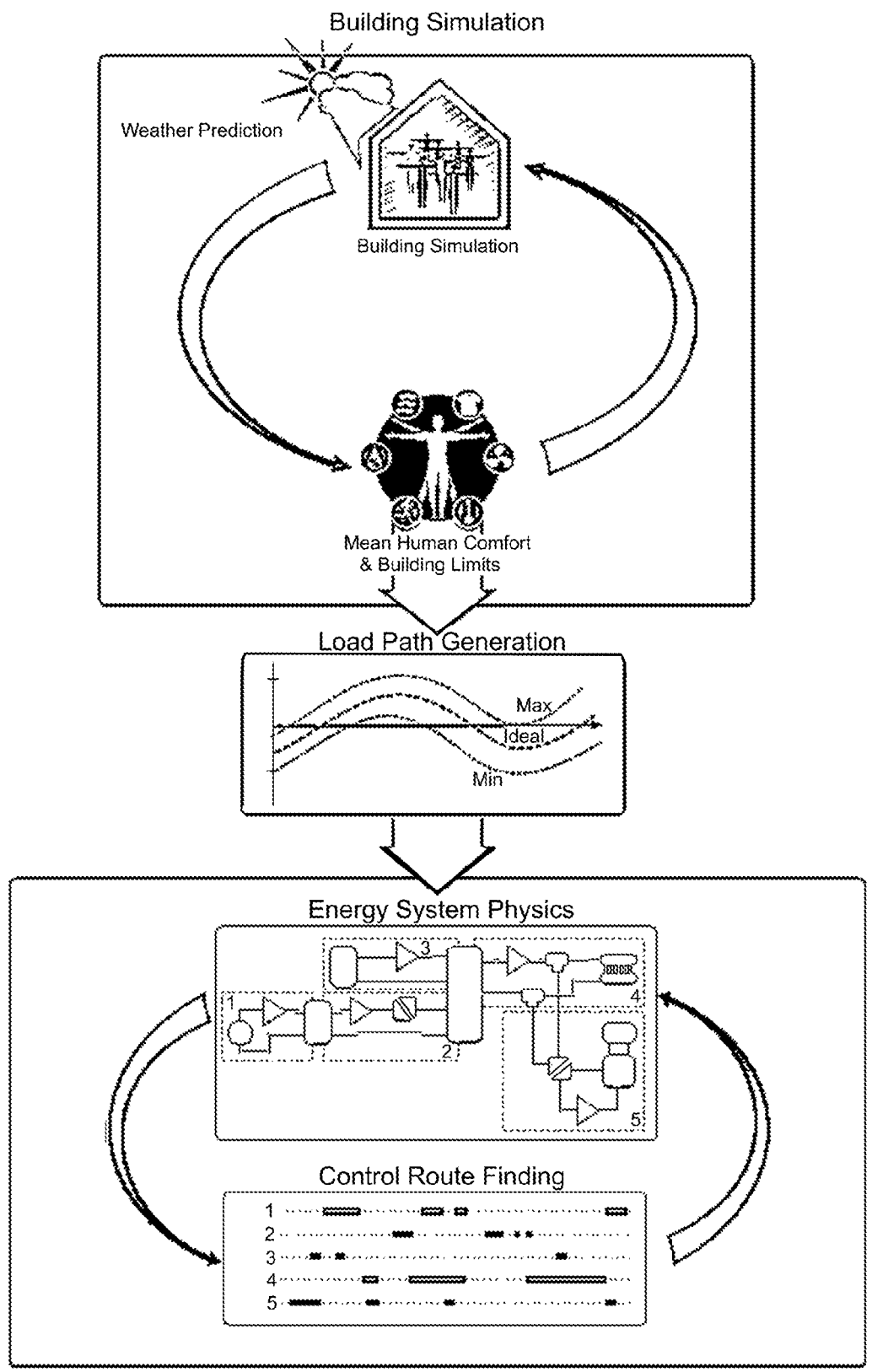
FIG. 16—One embodiment of a complete building automation system device with comfort management.

Another embodiment can be seen in FIG. 16, where the climate, internal loads, and occupants are inputs to the simulation of a building envelope model. The building envelope model generates an interior comfort path that is used as an input to a human comfort model of the occupants. The output of the human comfort model generates the load path by which the equipment simulation and control is generated as described above.

Another embodiment uses the comfort load path to generate n-number of simulations, such that they can be compared and the control regime selects the future control path having the best or most optimal control outcome as measured by a cost.

Figure 17:
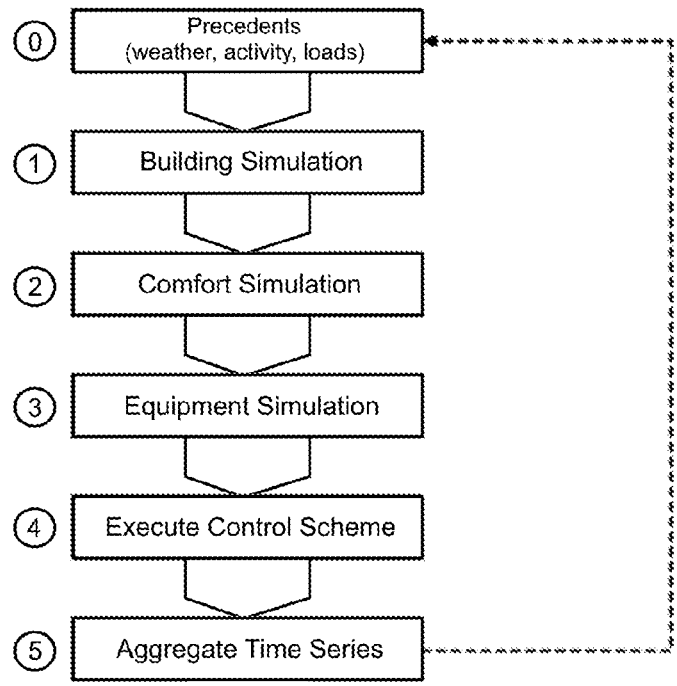
FIG. 17—One embodiment of a building automation system device sequence.
Figure 18:
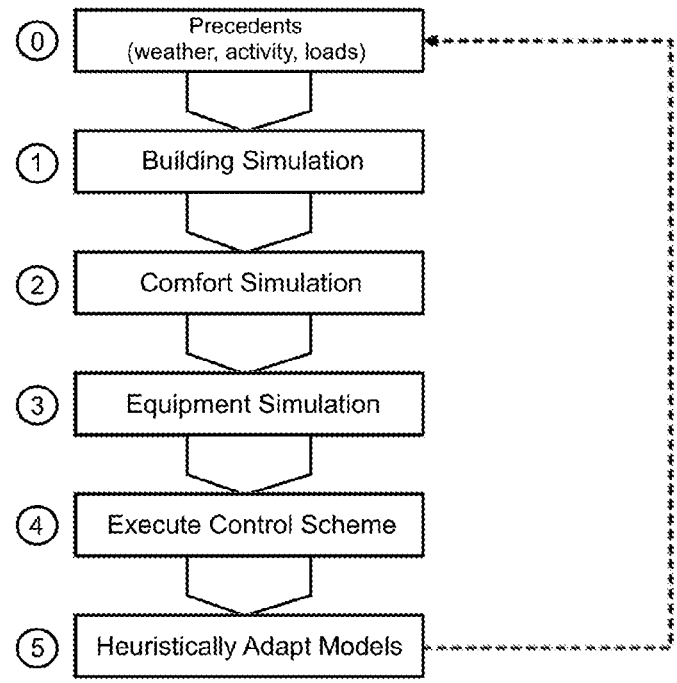
FIG. 18—One embodiment of a building automation system device sequence using regression of past histories to correct for system error.

Another embodiment can be seen in FIG. 17, where the controller stores the predicted sensor simulation time series, then compares the resulting actual time series of the controlled system. A means of regression is then used to compute new parameters of the simulation models as to bring the simulation into compliance with the real-world system response.

A simulation engine, in certain embodiments, may include one or more computational entities in a distributed network of simulation engines comprising a computational entity for evaluating at least one physical model which repeatedly, and in arbitrary order, may evaluate each of the arbitrary number of different physical models. The distributed network may comprise collocated computational entities as well as remote computational entities. Here, the physical model parameters may be adjusted to better fit the actual behavior of the controlled systems by means of regression fitting and/or correction between the simulated data and actual data of the sensors and/or control regimes. The mathematical model may comprise physics-based mathematical models and/or its constituent components. These may includes any of thermodynamic models, electrical response models, heat transfer models, component wear models, convection models, conduction models, radiation models, stratification models, ageing models, energy or thermal transport models, or the like.

Further, the mathematical model may comprise one or more of the following: building automation systems, heating systems, cooling systems, ventilation systems, power management systems, renewable energy systems, irrigation systems, occupancy systems, lighting systems, environmental control systems, humidity control systems, air quality management systems, window operator, shade systems, or the like.

Figure 5:
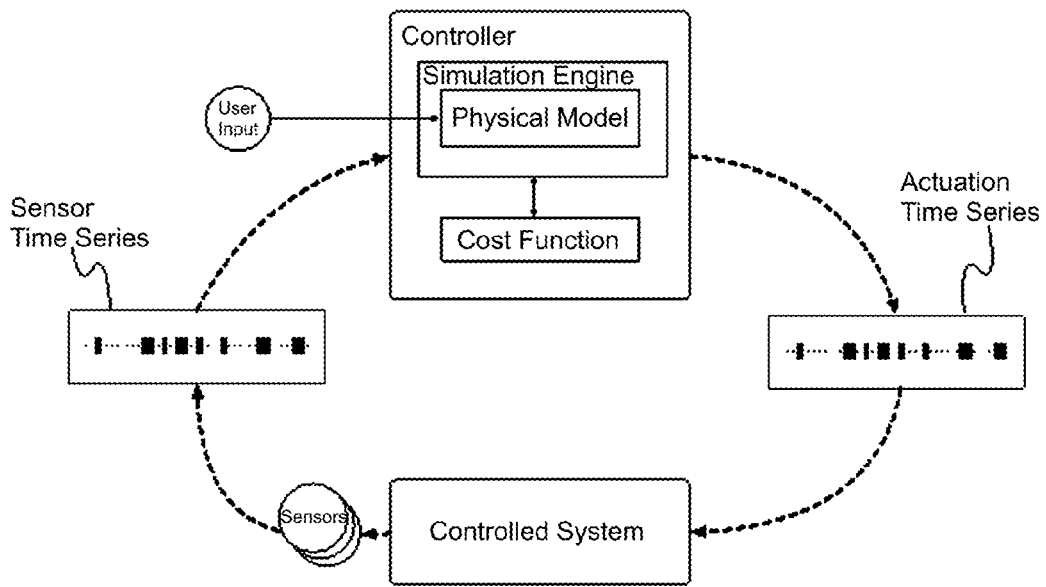

FIG. 5 shows one embodiment of how user input can be added to the system. User input can be done directly on the device, from a remote device, or the like. The addition of user input may allow for several factors of both the cost function and/or the physical model to be user controllable. User input can take many forms, including, but not limited to: direct parameter manipulation, system diagram alterations, comfort feedback, desired temperature, or the like.

Figure 6:
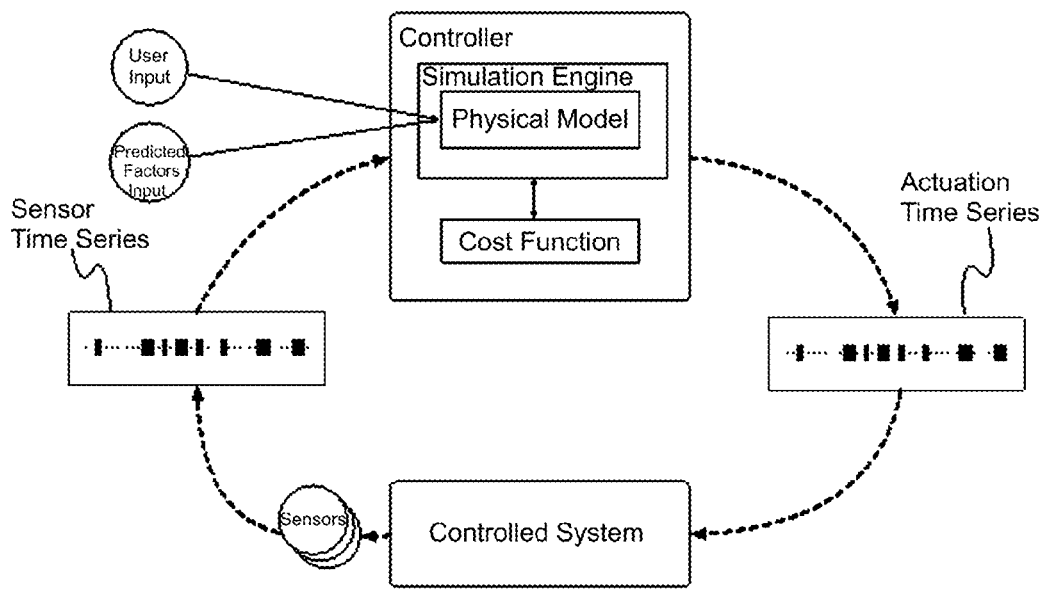

FIG. 6 shows one embodiment of how external predictions may also be taken into account. One example of external predictions is weather predictions. By taking into account weather predictions, in certain embodiments, the system can include more dynamic time variant costing of available resources.

Although the disclosure has been explained in relation to certain embodiments, it is to be understood that many other possible modifications and variations can be made without departing from the spirit and scope of the disclosure.

What is claimed is:
1. A building system controller, comprising:
a controlled system;
a sensor;
a physical model, working on the principle of a mathematical model of the controlled system's behavior and characteristics;
a simulation engine, designed to simulate one or more behaviors of the controlled system by evaluating the physical model;
a control loop, designed to utilize the simulation engine to predict a future behavior of the controlled system under a simulated control regime, the future behavior comprising simulated predicted sensor values;
an optimal cost function; and
an error band indicating an uncertainty in the simulated predicted sensor values such that the error band grows over time as predictions are made farther into the future, the error band determined based on a percentage range of a time series function of the simulated predicted sensor values with bounds ascertained from the optimal cost function;
wherein results of the simulated control regime are compared in terms of the optimal cost function, such that the simulated control regime having the optimal cost function is selected for controlling the controlled system; and
wherein the controlled system is controlled by the simulated control regime having the optimal cost function until the controlled system diverges from the simulated predicted sensor values beyond the error band, such that the control loop is formed and the control loop utilizes the simulation engine to predict a different future behavior in response to the controlled system diverging from the simulated predicted sensor values beyond the error band.

2. The building system controller of claim 1, wherein the control regime having an optimal cost function is performed by the controller, until sensor values diverge, at which point the physical model is evaluated again so as to seek a new regime having a new optimal cost function given the changed system conditions.

3. The building system controller of claim 1, wherein the optimal cost function comprises a discount function based on discounted future value of the optimal cost function.

4. The building system controller of claim 1, wherein the optimal cost function comprises a discount function that devalues the future cost of the control regimes, based on one or more of an accuracy and a probability of past predictions.

5. The building system controller of claim 1, wherein the optimal cost function utilizes a discount function that devalues future system costs as compared to current cost such that future uncertainty is accounted for, including one or more of: comfort, weather, energy, utility retail pricing, utility wholesale pricing, and peer-to-peer energy market prices.

6. The building system controller of claim 1, wherein the optimal cost function comprises models of one or more of: energy use, primary energy use, energy monetary cost, human comfort, the safety of one or more of a building and of building contents, the durability of one or more of a building and of building contents, microorganism growth potential, system equipment durability, system equipment longevity, environmental impact, and energy use $CO_2$ potential.

7. The building system controller of claim 1, wherein the mathematical model comprises one or more of: building models, human comfort models, climate models, equipment models, HVAC system models, energy systems, renewable energy systems, building envelopes, climate models, human comfort models, resource consumption models, thermodynamic models, electrical response models, heat transfer models, component wear models, convection models, conduction models, radiation models, stratification models, aging models, energy transport models, and thermal transport models.

8. The building system controller of claim 1, wherein the mathematical model method comprises one or more of: finite difference, finite element, finite volume, conduction transfer function, the State-Space method, the Direct Root Finding method, Explicit Finite Difference, the Implicit Finite Difference, and the Crank-Nicolson Finite Difference.

9. The building system controller of claim 1, wherein the optimal cost function compares control regimes for optimality by one or more of: differential comparison, multivariate population selection, statistical classification, neural nets, deep learning, reinforcement learning, deep reinforcement learning, ensemble learning, clustering, feature extraction, preference ranking, and benchmarking.

10. The building system controller of claim 1, wherein the physical model parameters are adjusted to better fit the actual behavior of the controlled systems by a method of regression between the simulated data and actual data of the sensors and control regimes.

11. The physical model parameters of claim 10, wherein the regression fitting method comprises one or more of: a heuristic, a metaheuristic, and a hyperheuristic, including one or more of: particle swarm organization, self-organizing migration algorithm, neural networks, group method of data handling, differential evolution, genetic algorithm, memetic algorithm, random forest, hill climbing algorithm, simulated annealing, monte-carlo methods, random search, fuzzy-logic, arithmetic mean, geometric mean, harmonic mean, trimean, median, mode, mid-range, quadratic mean (RMS), cubic mean, generalized mean, weighted mean, linear regression, logistic regression, polynomial regression, k-means clustering, k-nearest neighbors, decision trees, perceptron, multi-layer perceptron (neural network), kernel methods, support vector machines, ensemble methods, boosting, bagging, nave Bayes, expectation maximization, Gaussian mixture models, Gaussian processes, principal component analysis, singular value decomposition, reinforcement learning, Voronoi decomposition, and social theory voting techniques and concepts, including one or more of social welfare functions, social choice functions, single transferrable vote, Bucklin's rule, social decision schemes, collective utility functions, and Condorcet method and extensions including one or more of Copeland's rule, maximin, Dodgson's rule, Young's rule, and ranked pairs.

12. A building controller comprising:
at least one sensor interface;
at least one control interface;
a weather data source;
a controlled system;
a system physical model that computes a behavior of the controlled system;
a building physical model that computes a behavior of a building under control;
a memory; and
a processor operatively coupled to the memory, the at least one sensor interface, and the at least one control interface, and configured to execute program code stored in the memory to:
compute the building physical model using the weather data source to generate a load path;
generate a predictive control time series to compute the system physical model such that the system physical model approximates the load path, and outputting a predicted sensor time series;
actuate the controlled system via the at least one control interface using the predictive control time series until sensor data of the at least one sensor interface diverges from the predicted sensor time series beyond an error band indicating uncertainty in the predicted sensor time series and the error band grows as the predicted sensor time series makes predictions farther into the future, such that a control loop is formed, the control loop re-executing the program code to generate a different predictive control time series in response to the sensor data diverging from the predicted sensor time series beyond the error band, the error band determined based on a percentage range of the predictive control time series with bounds ascertained from an optimal cost function.

13. The building controller of claim 12, wherein the controlled system comprises one or more of the following: building automation systems, heating systems, cooling systems, ventilation systems, power management systems, renewable energy systems, irrigation systems, occupancy systems, lighting systems, environmental control systems, humidity control systems, air quality management systems, window operators, and shade systems.

14. The building controller of claim 12, wherein a sensor of the sensor interface comprises one or more of: weather data, temperature sensor, flow sensor, humidity sensor, $CO_2$ sensor, radiant temperature sensor, insolation sensor, wind sensor, occupancy sensor, rotational movement sensor, door movement sensor, rain sensor, snow sensor, light level sensor, time sensor, calendar, external data feeds, data streams, and sensors thereof.

15. The building controller of claim 12, wherein the simulation engine comprises one or more computational entities in a distributed network of one or more of the simulation engines and remote computational entities.

16. The building controller of claim 12, wherein sensor values of the sensor data comprise a mathematical fusion of a multiplicity of individual sensor values.

17. The building controller of claim 12, wherein a data feed of future data from an external source is combined with the sensor time series output of the building controller operating on the same data to provide durability of the data, such that one or more of gaps in the data feed and a lost connection do not compromise the availability of the data.

18. The building controller of claim 12, wherein one or more of sensor data and weather data of a building controller are combined with an external source of the same data, using local sensors to provide a modification of the data feed information such that it more accurately represents local conditions.

19. The building controller of claim 12, wherein the divergence from the computed time series values comprises one or more of: an error band, a mathematical function that computes the offset limits from predicted values, a percentage range of expected values, a time-series function of expected sensor values, a cost function boundary of expected sensor values, a human comfort limit of expected sensor values, and an equipment limit of allowed operation as determined by sensor values.

20. The building controller of claim 12, wherein the load path generated is computed via a physical model of human comfort of occupants contained within the physical model of the building.

21. The load path of claim 20, wherein the occupants of the human comfort model occupancy function are inferred via one or more of direct and indirect data feeds of occupancy activity, including one or more of: mobile device beaconing, mobile device trilateralization, access control, computer network activity, door sensor activity, mobile device addresses on a local network, acoustic activity, visual occupant tracking, and thermal activity.

* * * * *